May 29, 1945.    E. J. SAMUELSON    2,377,043
LADDER CART
Filed July 15, 1944    3 Sheets-Sheet 1

INVENTOR.
Einer J. Samuelson
BY
Atty.

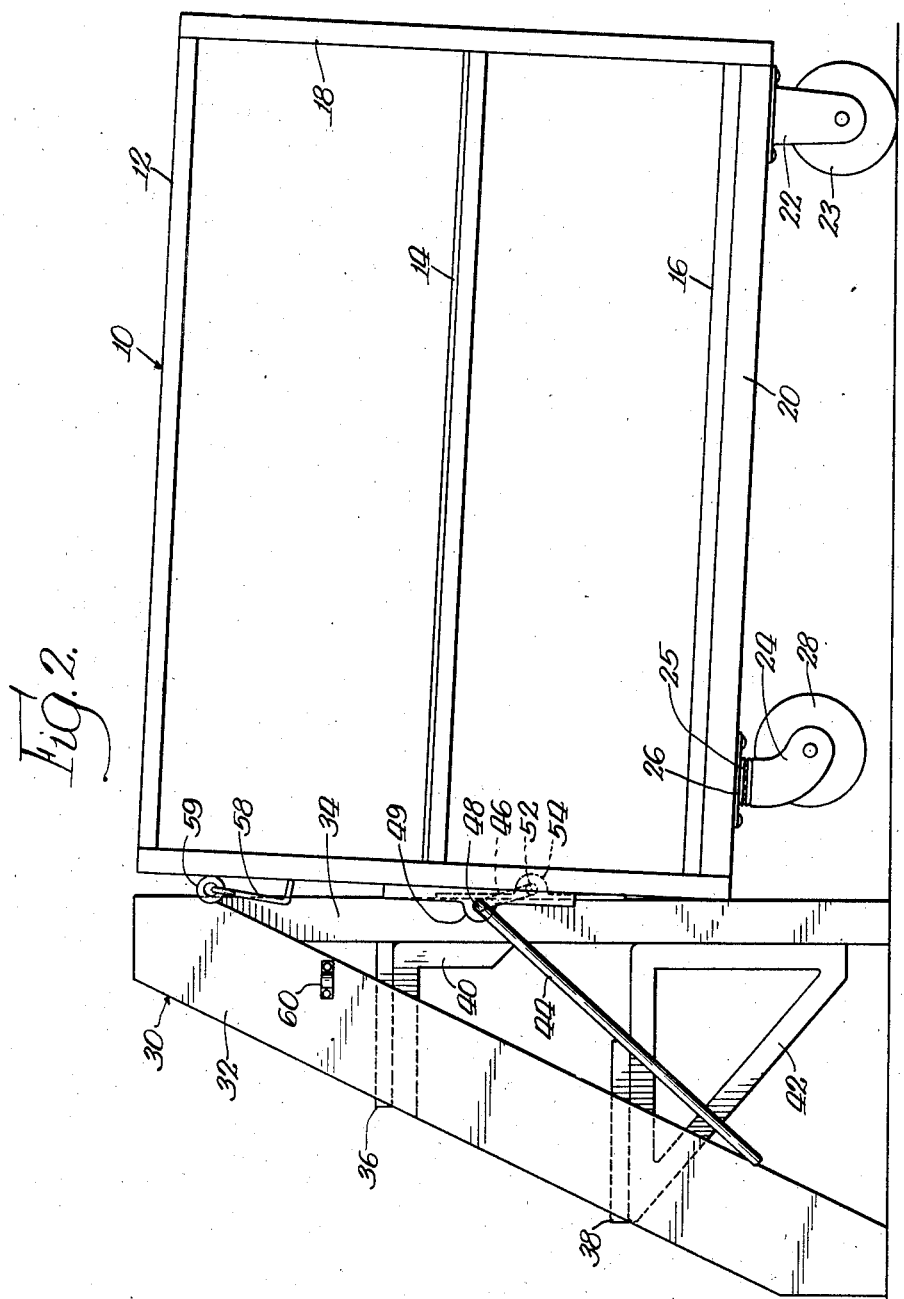

May 29, 1945.  E. J. SAMUELSON  2,377,043
LADDER CART
Filed July 15, 1944  3 Sheets-Sheet 3
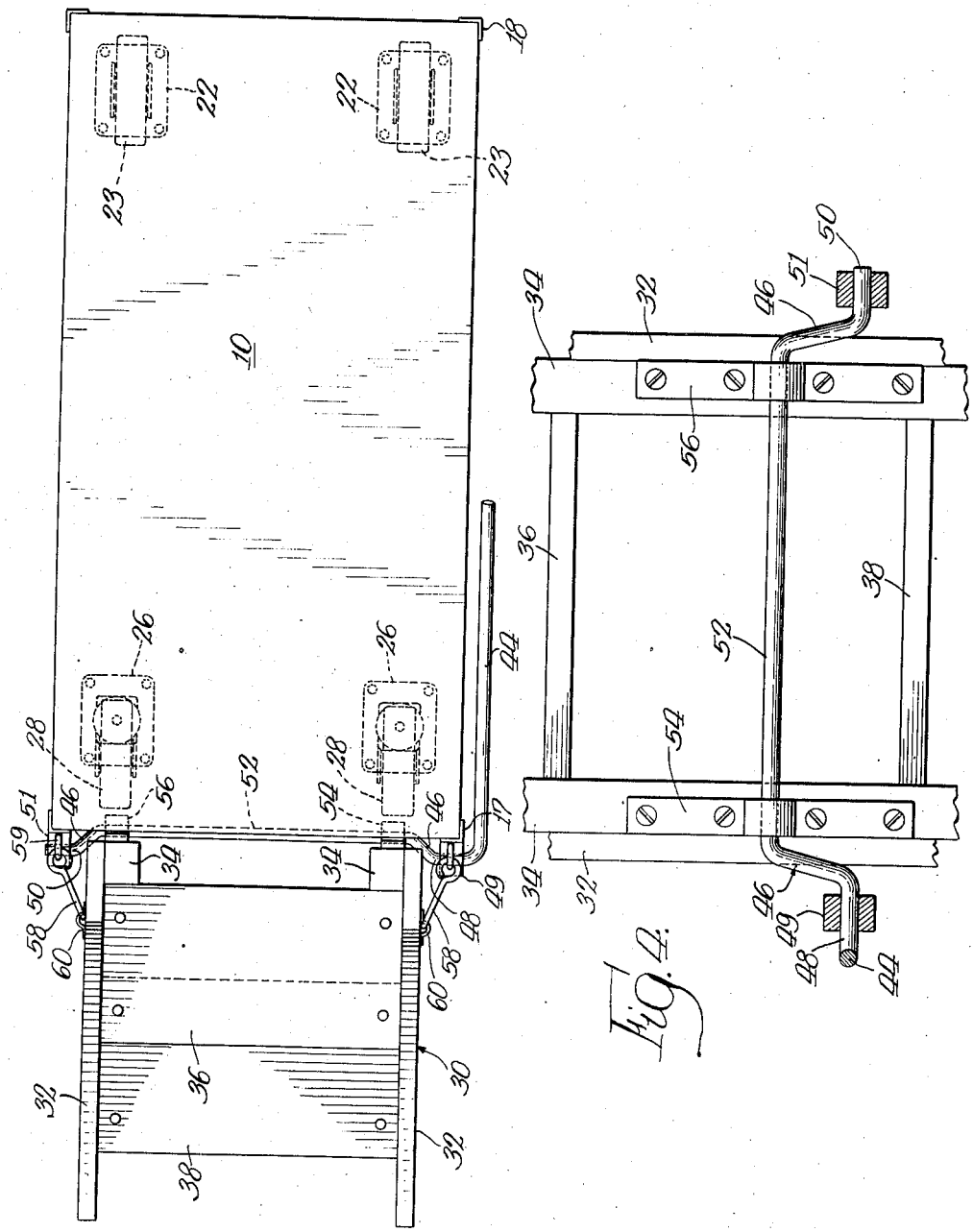
INVENTOR.
Einer J. Samuelson,
BY
Vernon D. Beeler
Atty.

Patented May 29, 1945

2,377,043

UNITED STATES PATENT OFFICE 2,377,043

LADDER CART

Einer J. Samuelson, Chicago, Ill.

Application July 15, 1944, Serial No. 545,143

5 Claims. (Cl. 228—6)

My invention relates to trucks or carts and particularly small hand carts for use in carrying small articles around a stock room and has particular reference to a cart equipped with a ladder of some kind so that the ladder will always be conveniently on hand when the contents of the cart are to be loaded on shelves or similar places of storage.

Among the objects of my invention is to provide a new and improved stock room accessory unit for carting stock which is likewise provided with a ladder to permit the operator to readily reach higher shelves and places of storage so that the stock may be easily and quickly unloaded without undue loss of time.

Another object of my invention is to provide a stock room cart or truck which has a ladder device permanently attached to it and so mounted that after being carried to the place where stock is to be unloaded from the cart the ladder may be set upon the floor by a mechanism which at the same time will permit the ladder to serve as a brake for the cart anchoring it in place during the unloading.

Still another object of my invention is to provide a truck having one set of fixed wheels and one set of swivelled wheels for ease in steering and which is provided with a ladder arrangement so connected to the truck that it can be used as a means for rendering the swivelled wheels ineffective thereby positioning the truck immovably upon the floor while the ladder is in use.

A further object of my invention is to provide a cart or truck equipped with a ladder device capable of being used as a brake, the ladder device being so fastened to the truck that the fastening means may serve the combined function of locking the ladder in lifted position so that it can be carried about by the truck or locking the ladder to the truck in a position upon the floor so that there will be no tendency for the truck to shift its position while the ladder remains upon the floor.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 2 is a side elevational view of my device showing the ladder upon the floor and the truck elevated in locked position against it.

Figure 3 is a top view of my invention with the ladder positioned as shown in Figure 1.

Figure 4 is a fragmentary view of the means for attaching the ladder to the truck taken on the line 4—4 of Figure 1.

Figure 1:
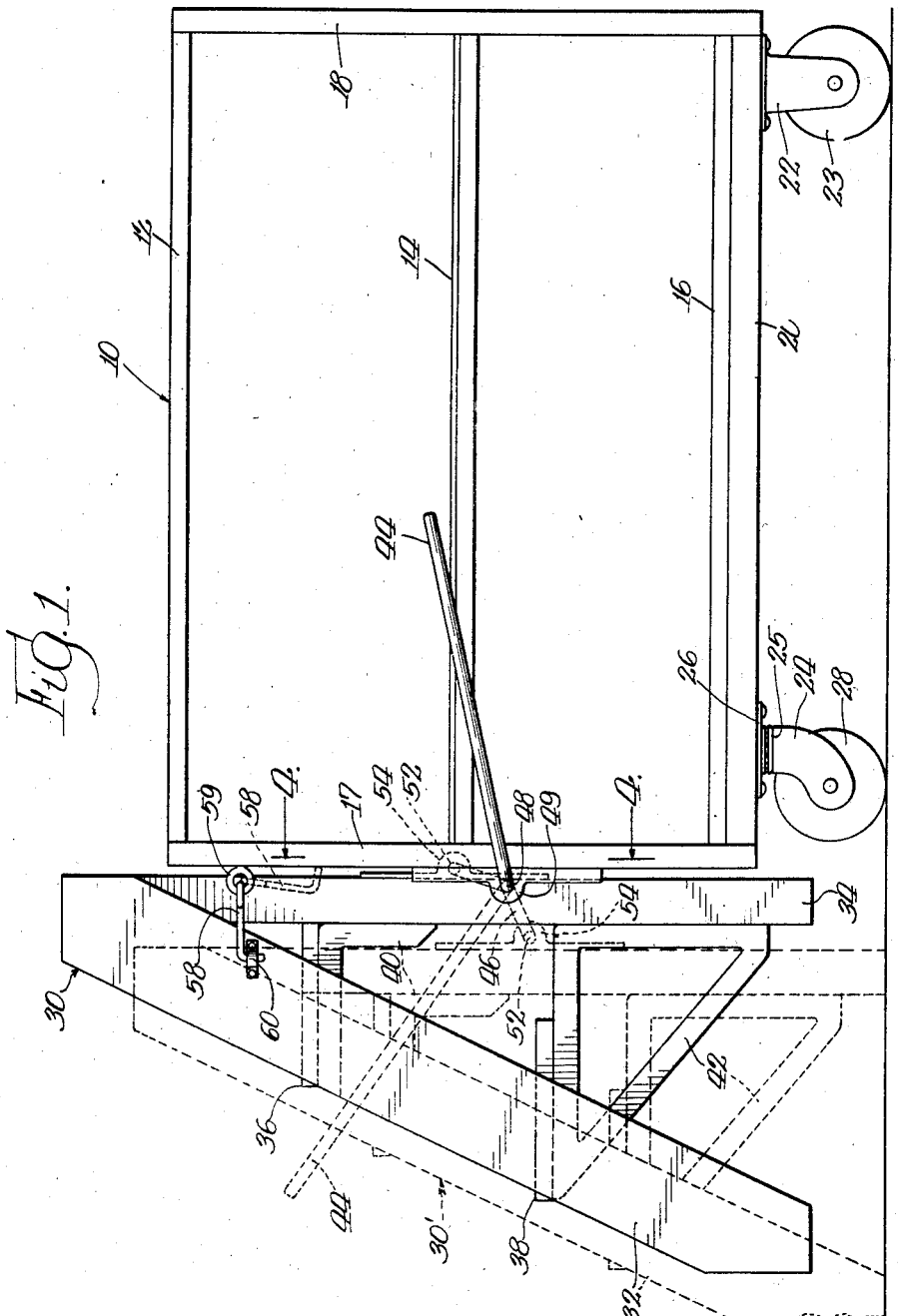
Figure 1 is a side elevational view of my device showing in full lines the ladder lifted into position upon the truck and in dotted lines the ladder extended so that it rests upon the floor.

Stock rooms for small articles of merchandise are frequently arranged so that there are high tiers of shelves in long rows with relatively narrow aisles between them. In cases where small articles of merchandise are to be stored shelves are apt to be close together and the space becomes relatively crowded. Frequently, also, it is necessary to do a great deal of handling of the stock; removing it for shipment and replacing additional stock on the shelves. In order to save time it is necessary that the stock room personnel be provided with some means for carrying quantities of stock from place to place, keeping it separate so that a quantity may be quickly and efficiently unloaded at one shelf or bin and then making it possible for the cart to be moved along to another shelf for an equally efficient unloading and reloading if necessary.

When the stacks of shelves are high it is invariably necessary to use a ladder of some kind to reach higher shelves. If the work is to be performed efficiently the ladder must be conveniently near the shelves. Unless many ladders are to be provided one or more in each aisle, there must be some ready and convenient means of carrying a ladder about from place to place so that it will always be available for use.

The present invention contemplates utilizing the cart or truck which is employed for carrying stock as a means for carrying a ladder from place to place so that it will always be with the cart making the job of unloading and placing the stock on higher shelves a convenient proposition. In order to keep the device as simple and efficient as possible the ladder itself performs the additional function of a brake for the cart or truck in order to hold it in position adjacent the shelves while the operator stands upon the ladder or the top of the cart to unload its contents.

As shown in the drawings there is provided a conventional type cart or truck 10 provided with horizontal shelves 12, 14 and 16 for carrying small articles of merchandise and end walls 17 and 18 respectively for supporting the shelves. The cart has a bottom 20 provided at one end with a pair of brackets 22 bolted in fixed position and designed to be mounted upon rollers 23.

At the other end is a second pair of brackets 24 swivelled by means of roller bearings 25 attached by a plate 26 to the bottom of the cart. The brackets are supported on corresponding rollers 28.

The truck is equipped with a ladder-like member 30 comprising a pair of obliquely extending step supporting legs 32 and a pair of vertical legs 34. Steps 36 and 38 are attached at their ends to the step supporting legs and are likewise supported respectively by braces 40 and 42 which in turn are secured to the vertical legs.

A single means of attachment holds the ladder fast to the cart. This means may be embodied in a lever having an arm 44 for manipulating it. The lever has a section 46 extending generally at right angles to the arm which has one end 48 attached by a bracket 49 to one side of the cart and a second end 50 attached by means of a bracket 51 to the cart at the other side. The attachment permits the right angle section to rotate freely in a horizontal plane.

The section is provided with an offset portion 52 which is in turn rotatably attached by means of brackets 54 and 56 to the respectively adjacent vertical legs 34.

When the cart is being moved about the ladder is lifted into position against the end 17 of the truck which has the swivelled brackets 24. In this position the lever 44 lies adjacent the cart and the centerline of the offset portion which is secured to the vertical ladder legs is above the point where the right-angled section is attached to the cart and slightly to the right as viewed in Figure 1. By maintaining this relationship of parts the weight of the ladder tends to lock it against the cart. So that the ladder may not slip out of place there is provided a hook 58 at each side attached by means of an eye 59 to the adjacent end of the truck and engaging a catch 60 on the ladder as shown in Figure 1.

When it is desired to use the ladder as a brake for holding the truck in position it is extended first to the dotted line position 30 shown in Figure 1 and then the cart is lifted against it to the position shown in Figure 2.

In the dotted position shown in Figure 1 the ladder merely rests upon the floor. In order to anchor the cart in position the lever 44 is pushed downwardly into position shown in Figure 2. By tracing the position of the right angle section where it is fastened to the cart from the position shown in Figure 1 to the position shown in Figure 2, it will be apparent that the right angle section is rotated upwardly about the offset portion which remains stationarily positioned upon the vertical leg of the ladder. By reason of this movement the end of the cart to which the lever is secured is lifted off the floor and moved to a position against the vertical legs. This means that the swivelled rollers are likewise lifted off the floor and the cart is anchored at that end to the ladder which rests solidly upon the floor.

This means that the rollers at the other end, being fixed in position, will not permit that end of the cart to move sideways and the ladder being solid upon the floor and bearing the weight of one end of the cart will prevent the cart from rolling endwise. With the cart thus elevated a stock room clerk can ascend the ladder and stand upon the top of the cart while it is being unloaded and its contents placed upon the higher shelves.

Because of the fact that the right angle attached part of the lever is slightly over center to the left as viewed in Figure 2, the weight of the cart is utilized to force the cart against the vertical legs and becomes locked in that position so that additional weight such as a person stepping on the top of the cart will tend to add to the security of holding the cart in position.

When it is desired to replace the adjacent end of the cart upon the floor it is necessary only to lift the lever 44 from the position shown in Figure 2 to the dotted position shown in Figure 1 and then move it to the solid line position shown in Figure 1 thereby lifting the ladder into position against the cart so that it can be again moved about.

There has thus been provided a convenient ladder arrangement for stock room and similar use by virtue of which a cart for carrying stock is always provided with a ladder for assisting the placing of stock on the higher shelves, the ladder being so attached that it serves the useful purpose of anchoring the cart in a fixed position while the ladder is in use.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A ladder cart comprising a wheeled truck body, a swivel wheeled support positioned at one end thereof, a ladder member in elevated position at the swivelly wheeled end of the cart comprising a pair of oblique step supporting elements extending outwardly and a pair of leg elements adjacent the cart attached to the step supporting elements and means for attaching the leg elements to the cart comprising a lever having an arm at the side of the cart and a section at right angles to the arm journalled at spaced locations on opposite sides of the cart, an offset portion on said right angular section between the journalled ends thereof rotatably attached to the respective leg elements, said ladder having a position on the floor wherein the rotatably attached parts of the offset portion are in one position with relation to the journalled ends, and said ladder having a riding position wherein the rotatably attached parts of the offset portion are in another position with relation to the journalled ends thereby holding the ladder in a lifted position upon the cart.

2. A ladder cart comprising a wheeled body, a swivel wheel support positioned at one end thereof, a ladder member in elevated position at one end of the cart comprising a pair of oblique step supporting elements extending outwardly and a pair of leg elements adjacent the cart in braced attachment to the step supporting elements and means for attaching the leg elements to the cart comprising a lever having an arm at the side of the cart and a section at right angles to the arm journalled at spaced locations on opposite sides of the cart, an offset portion on said right angular section between the journalled locations thereof rotatably attached to the respective leg elements, said ladder having one position on the floor wherein the rotatably attached parts of the offset portion are below and nearer the cart than the journalled locations whereby the adjacent end of the cart is in lifted position against the ladder, and said ladder having a riding position wherein the rotatably attached parts of the offset portion are above and nearer the cart than the journalled locations thereby holding the ladder in a lifted position adapted to be carried by the cart.

3. A ladder cart comprising a wheeled body, a ladder member in elevated position at one end of the cart comprising a pair of oblique step supporting elements extending outwardly and a pair of leg elements adjacent the cart in braced attachment to the step supporting elements and means for attaching the leg elements to the cart comprising a lever having an arm at the side of the cart and a section at right angles to the arm journalled at spaced locations on opposite sides of the cart, an offset portion on said right angular section between the journalled locations thereof rotatably attached to the respective leg elements, said ladder having one position on the floor wherein the rotatably attached parts of the offset portion are below and nearer the cart than the journalled locations whereby the adjacent end of the cart is in lifted position against the ladder, and said ladder having a riding position wherein the rotatably attached parts of the offset portion are above and nearer the cart than the journalled locations thereby holding the ladder in a lifted position adapted to be carried by the cart.

4. A ladder cart comprising a body providing a platform, a pair of wheels set in fixed position at one end, a pair of wheels swivelly positioned at the other end, a ladder member in elevated position at the end of the cart adjacent the swivelled wheels comprising a pair of oblique step supporting elements extending outwardly and a pair of leg elements adjacent the cart in braced attachment to the step supporting elements and means for attaching the leg elements to the cart comprising a lever having an arm at the side of the cart and a section at right angles to the arm having ends thereof journalled at spaced locations to opposite sides of the cart, an offset portion on said right angular section between the journalled ends thereof rotatably attached to the respective leg elements, said ladder having an anchored position on the floor wherein the rotatably attached parts of the offset portion are below and nearer the cart than the journalled ends whereby the adjacent end of the cart is in lifted position against the ladder, and said ladder having a riding position wherein the rotatably attached parts of the offset portion are above and nearer the cart than the journalled ends thereby locking the ladder in a lifted position adapted to be carried by the cart.

5. A ladder cart comprising a body provided with shelves for merchandise, a pair of wheels set in fixed position at one end, a pair of wheels swivelly positioned at the other end, a ladder member in elevated position at the end of the cart adjacent the swivelled wheels comprising a pair of oblique step supporting leg elements extending outwardly and a pair of substantially vertical leg elements adjacent the cart in braced attachment to the step supporting elements, and means for attaching the vertical leg elements to the cart comprising a lever having an arm at the side of the cart and a section at right angles to the arm having ends thereof journalled at spaced locations to opposite sides of the cart, an offset portion on said right angular section between the journalled ends thereof rotatably attached to the respective vertical leg elements, said ladder having an anchored position on the floor wherein the rotatably attached parts of the offset portion are below and nearer the cart than the journalled ends whereby the adjacent end of the cart is in lifted position against the ladder, and said ladder having a riding position wherein the rotatably attached parts of the offset portion are above and nearer the cart than the journalled ends thereby locking the ladder in a lifted position adapted to be carried by the cart, and auxiliary means for hooking the ladder to the cart in said lifted position.

EINER J. SAMUELSON.